United States Patent
Nitschke et al.

(10) Patent No.: US 6,397,280 B1
(45) Date of Patent: May 28, 2002

(54) SLAVE STATION, MASTER STATION, BUS SYSTEM AND METHOD FOR OPERATING A BUS

(75) Inventors: Werner Nitschke, Ditzingen; Otto Karl, Leonberg-Hoefingen; Joachim Bauer, Oberstenfeld Prevorst, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,486

(22) PCT Filed: Sep. 26, 1997

(86) PCT No.: PCT/DE97/02223

§ 371 (c)(1),
(2), (4) Date: Jul. 23, 1999

(87) PCT Pub. No.: WO98/23124

PCT Pub. Date: May 28, 1998

(30) Foreign Application Priority Data

Nov. 19, 1996 (DE) .......................................... 196 47 668

(51) Int. Cl.[7] .............................................. G06F 13/00
(52) U.S. Cl. ........................ 710/110; 709/208; 713/300
(58) Field of Search ................................ 710/100, 110, 710/104; 713/300, 330, 340; 709/208

(56) References Cited

U.S. PATENT DOCUMENTS

| 4,209,666 A | | 6/1980 | Lawton |
| 4,328,586 A | * | 5/1982 | Hansen .......................... 375/36 |
| 4,507,793 A | * | 3/1985 | Adams .......................... 375/257 |
| 6,005,869 A | * | 12/1999 | Sakai et al. .................. 370/452 |

FOREIGN PATENT DOCUMENTS

| DE | 33 30 904 | | 3/1985 |
| GB | 1 507 609 | | 4/1978 |
| JP | 357024131 | * | 2/1982 |
| JP | 357202160 A | * | 12/1982 |
| JP | 05316568 A | * | 11/1993 |
| JP | 409037352 | * | 2/1997 |
| JP | 409064712 | * | 3/1997 |
| WO | WO 90 01245 | | 2/1990 |

* cited by examiner

Primary Examiner—Xuan M. Thai
(74) Attorney, Agent, or Firm—Kenyon & Kenyon (57) ABSTRACT

A bus system with a master station and a plurality of slave stations is described. The slave stations have a connecting switch, with the downstream slave stations having no electric contact with the master station when the connecting switch of a first slave station is opened. In this phase, the first slave station is initialized. Before closing the connecting switch, a test switch is closed, with the current flow being limited by a current limiter. It is thus possible to check on whether the downstream slave station has a short circuit.

23 Claims, 5 Drawing Sheets

SLAVE STATION, MASTER STATION, BUS SYSTEM AND METHOD FOR OPERATING A BUS

FIELD OF THE INVENTION

Background Information

The present invention relates to a slave station, a master station, a bus system and a method of operating a bus system. Conventional bus systems where a plurality of slave stations are connected to a master station by bus lines. Electric power is supplied to the slave stations by the power supply voltage supplied by the master station.

SUMMARY OF THE INVENTION

The slave station of the present invention has the advantage, however, that not all slave stations are connected to the power supply voltage at the same time. Therefore, the bus system is initialized for each slave station individually in succession, so that the bus lines are not carrying high loads. In addition, each slave station can thus be initialized independently of the other slave stations, so that any faults occurring can be allocated to the individual bus stations especially easily. It is thus recognized quickly and easily during initialization whether the bus system is fully functional and where faults are when they occur. The master stations of the present invention have the advantage that with a ring structure, faults can be compensated especially well, because the individual slave stations can be reached by different pathways. An especially simple means for detecting faults consists of current monitoring in the master station, in particular when the bus stations are initialized individually and in succession. The method of the present invention is suitable in particular for detecting a fault in the bus system and guaranteeing at least the functioning of the remaining system through suitable measures.

Due to the use of a test switch with a limited current flow, the lines downstream from the slave station and/or the downstream slave stations can be tested for a short circuit. A working energy storage mechanism which can also be charged over the bus lines may be provided for storing large quantities of energy. The ongoing energy for operation of the slave station is also obtained from the electric voltages on the bus lines. The slave stations can be driven to trigger predetermined actions in accordance with messages sent over the bus lines. In addition, the master station can send messages causing a reconfiguration of the slave stations. To do so, first the connecting switches are opened again. During initialization, the individual addresses can also be issued by the master station. The logic required for this can be minimized in particular because only one individual slave station is initialized in each case. During or after the initialization, the slave stations can send return signals back to the master station to thereby confirm their functionality. With a ring structure, messages can be supplied to both sides of the ring. Individual slave stations are still achieved even when there is a disturbance between two stations or in one slave station. Analysis of the current flow in operation of the bus system can give an indication of a possible disturbance.

DETAILED DESCRIPTION

Figure 1:
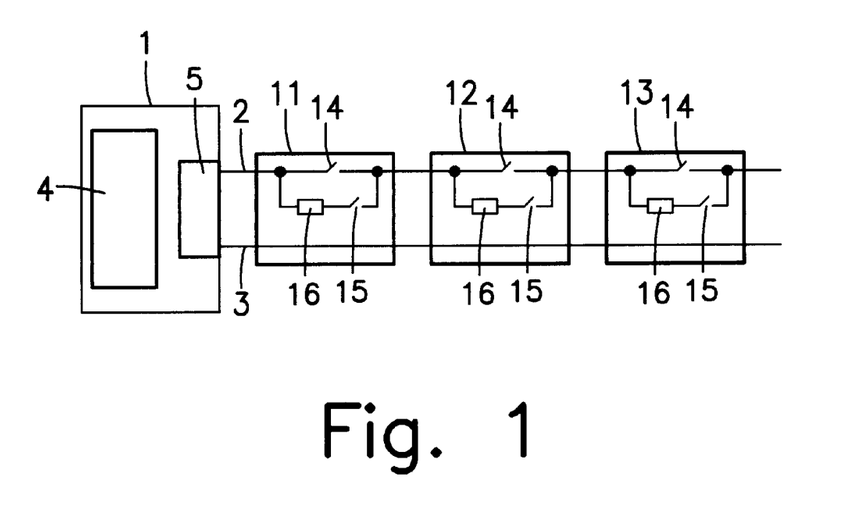
FIG. 1 shows an exemplary embodiment of a bus system with a master station and slave stations according to the present invention.

FIG. 1 shows a bus system with a master station 1 and multiple slave stations 11, 12, 13, interconnected by two bus lines 2 and 3. Master station 1 has a control logic 4 and an interface 5. Each of the three slave stations 11, 12, 13 shown has a connecting circuit 14 and a test switch 15. A current limiter 16 is connected in series with test switch 15. Master station 1 is controlled by control logic 4. Such a control logic may be, for example, a microprocessor with a memory, with a suitable program being written to the memory. Then interface 5 is controlled by control logic 4, with a conversion of the commands of control logic 4 to the corresponding bus levels, i.e., corresponding current or voltage signals which are delivered to bus lines 2 or 3, taking place in interface 5. Master station 1 is electrically connected to slave stations 11, 12, 13 by bus lines 2 and 3, so that the master can send messages to slave stations 11, 12, 13 by appropriate electric signals (current or voltage signals) or optionally can receive messages from slave stations 11, 12, 13.

Figure 2:
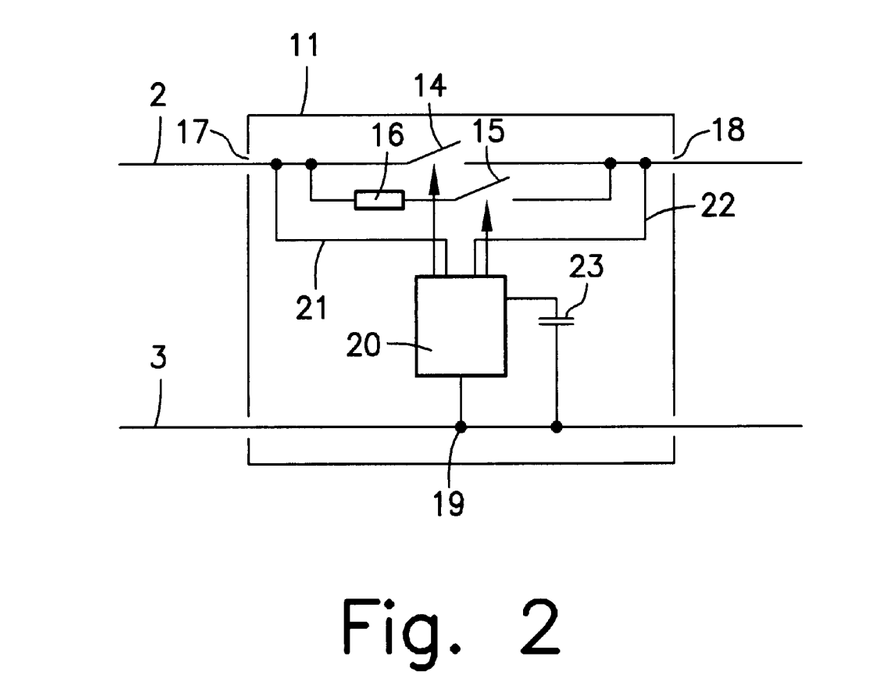
FIG. 2 shows a slave station according to the present invention.

FIG. 2 shows a slave station 11 from FIG. 1 in detail. The other slave station s 12, 13, . . . are designed similarly. Bus line 2 leading away from master station 1 is connected to a first terminal 17 of slave station 11. Inside slave station 11 terminal 17 can be connected to a second terminal 18 by connecting switch 14, with bus line 2, which leads further to slave station 12, then being connected to this second terminal 18. In addition, the first terminal 17 and second terminal 18 can still be connected electrically by test switch 15 in slave station 11. However, the current flowing then is limited by current limiter 16 connected in series with test switch 15. Current limiter 16 is shown here as a resistor for the sake of simplicity. However, any other current sources with a limited current are also conceivable. In addition, slave station 11 has a control logic 20 which is connected by lines 21 and 22 to terminals 17 and 18 and thus to bus line 2. In addition, an energy storage mechanism, which is designed here as a capacitor and is arranged between control logic 20 and bus line 3, is provided.

In a normal operating state, switches 14 of all slave bus stations 11, 12, 13 are closed, so that the respective inputs 17 and 18 of the individual slave bus stations are short-circuited together. Thus, the same electric voltage is applied to all bus stations, i.e., to master station 1 as well as slave stations 11 through 13 on bus line 2. The same thing is true of bus line 3. Any voltage drop over the length of bus lines 2, 3 is disregarded. In this operating state, master station 1 maintains a voltage difference between bus lines 2, 3, and slave stations 11 through 13 obtain the electric power required for their operation from this voltage difference. For sending messages, electric signals in the form of a current or a voltage signal, for example, are sent over bus lines 2, 3. So that the power supply to the slave stations is not disturbed or interrupted, each slave station has an energy storage mechanism, e.g., capacitor 23 shown in FIG. 2, guaranteeing the functioning of logic circuit 20 of the slave stations regardless of the signals applied to bus lines 2, 3. Since power is supplied to the slave stations over the bus lines, a very large current would have to flow over bus lines 2, 3 to charge this energy storage mechanism in the first startup. This is the case in particular when the energy stored in the energy storage mechanism must be relatively great to be able to trigger an electric action, for example. Such an electric action, which requires a relatively large energy storage mechanism, would be, for example, if the slave stations were to deploy a driving set of an airbag system by an ignition current. The slave stations shown in FIGS. 1 and 2 are then capable of charging their respective energy storage mechanisms in succession with a first startup or initialization of the bus system, so that the current flowing over the bus in this operating state is minimized. This will now be explained on the basis of FIG. 2.

In the first startup or initialization of the bus system, all connecting switches 14 and all test switches 15 are first opened, so that the first and second terminals of the slave bus stations are not electrically connected. Bus line 2 is thus interrupted in each slave station 11, 12, 13. When an electric voltage difference is applied by master station 1 between bus lines 2 and 3, this voltage difference is first applied only to input 17 of first slave station 11, which follows master station 1 directly. Logic circuit 20 of slave station 11 is connected to terminal 17 by line 21, so this logic circuit is supplied with electric power and can thus perform the required initialization step for initialization of first slave station 11. Logic circuit 20 will first charge energy storage mechanism 23 to ensure that sufficient energy is available to supply logic circuit 20. This can also be accomplished by fixedly connecting energy storage mechanism 23, which is designed as a capacitor, to line 21 and bus line 3. Other energy storage mechanisms may also be provided, and may be switched by logic 20 between bus lines 2 and 3 only as needed during initialization. Then logic circuit 20 can perform additional initialization steps of slave station 11. For example, logic circuit 20 may in turn generate a signal between bus lines 2 and 3 and thus send a signal to master station 1. This life signal or acknowledge then notifies master station 1 that first slave station 11 has been initialized. Master station 1 can store this information. In addition, it is possible in this phase of initialization for master station 1 to assign an address to first bus station 11 by sending a suitable message over the bus. Since downstream slave stations 12, 13 are still electrically isolated from master station 1, there is no danger of this address being assigned incorrectly. However, the address may also be deposited from the beginning in a memory in logic 20.

After control logic 20 of first slave station 11 has processed all the steps necessary for initialization, it then triggers a switch signal to close test switch 15. Then terminal 17 is connected electrically to claim 18 by this test switch 15, but the current flowing then is limited by current limiter 16. Bus line 2 is thus electrically connected to second slave station 12 through first slave station 11, but the current flowing is limited. Energy storage mechanism 23 of slave station 12 must first be charged, so the voltage at second terminal 18 of slave station 11 remains behind the voltage applied to terminal 17 because the current flow over test switch 15 is limited by voltage limiter 16. If energy storage mechanism 23 of downstream slave station 12 is then charged, the electric voltage at second terminal 18 of slave station 11 will assume the same value as that at first terminal 17. However, if there is a short circuit between bus lines 2 and 3 between slave stations 11 and 12 or within slave station 12, the voltage applied to terminal 18 will never reach the value of the voltage at terminal 17. Only when logic circuit 20 ascertains that the potential difference between two terminals 17 and 18 has dropped below a predetermined level will it trigger a signal for closing connecting switch 14 by means of which terminals 17 and 18 are connected together with a low resistance.

Figure 3:
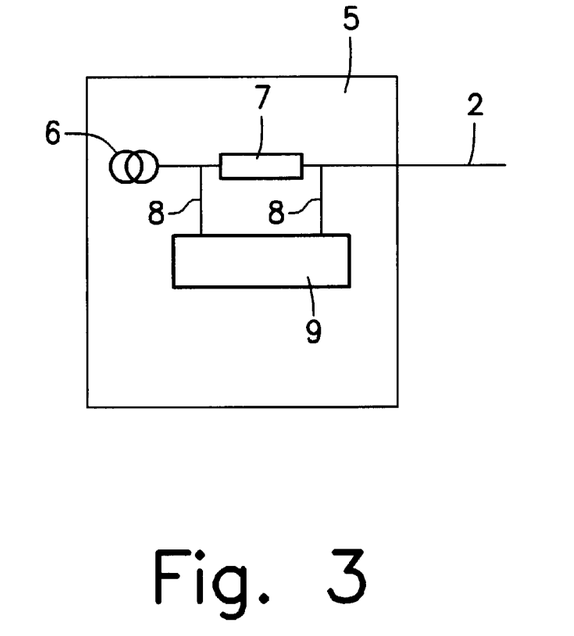
FIG. 3 shows a current sensor according to the present invention.

If all the slave stations are designed as shown in FIG. 2, all the slave stations are initialized in succession, i.e., the first slave station 11 is initialized first; then when this initialization is concluded, the next slave station 12 is initialized; and when this initialization is concluded, the next slave station 13 is initialized. With each partial initialization, first only the energy storage mechanism of a single slave station is charged so the currents flowing over bus lines 2, 3 are low. In addition, this ensures that when there is an electric short circuit within or between slave stations, the slave stations upstream from the short circuit can still be addressed because the slave station directly upstream from the short circuit will not close low-resistance connecting switch 14 because of the voltage differences between first and second terminals 17, 18. The bus system designed in this way is thus fault tolerant in the sense that a short circuit between bus lines 2 and 3 does not lead to a total failure of the bus system but instead only the slave stations downstream from the short circuit can no longer be reached from master station 1. During initialization, it is desirable for master station 1 to receive information on which slave stations are initialized and thus ready for operation. As already described, this can take place by having the slave stations send a signal to the master station in the course of their respective partial initialization, signaling the readiness of the respective slave station for operation. Another possibility is for a current sensor to be arranged in interface 5 for detecting the closing of test switch 15. FIG. 3 shows such a current sensor. Therefore, a current source 6 is provided in interface 5 and is connected by resistor 7 to bus line 2. A voltmeter 9 is connected by connecting lines 8 upstream and downstream from resistor 7 to detect the voltage drop across resistor 7. Then the current flowing in bus line 2 can be determined on the basis of the voltage drop at resistor 7. Shortly before an initialized slave station delivers the signal for operation of test switch 15, the current flow in bus line 2 is low because the energy storage mechanism of the slave bus station just initialized is full. After closing test switch 15, first a high current corresponding essentially to the maximum current of current limiter 16 flows through bus line 2, which can then be detected by the current sensor in interface 5. This current signal is a sign for master station 1 that a first slave bus station (e.g., station 11) has just been initialized and now the second slave station (e.g., station 12) is being initialized. By observation of the currents flowing on the bus lines, master station 1 can thus ascertain whether the initialization of all slave stations 11, 12, 13 has taken place or whether there might be a fault in one of these stations.

After initialization of all slave stations 11 through 13, the bus system is in the normal operating state, i.e., messages can now be exchanged between the individual bus stations. In particular, master station 1 can send commands to slave stations 11, with which actions of the individual slave stations are triggered. The bus system shown here can be used, for example, to deploy safety systems, such as multiple airbag systems and seat belt locks in a motor vehicle, for example. The message would then contain simply trigger commands for the different slave stations. With such systems, it is desirable that even after a partial failure of the bus system, the other bus stations can still be addressed. Thus, if during initialization, which can be performed each time the motor vehicle is started, for example, it is found that the side airbag has failed, for example, the front airbag should still be deployable nevertheless. In addition, it is desirable in this case for the master station to obtain information regarding the fact that the side airbag cannot be addressed, in order to provide an appropriate warning for the driver. In addition, there must be assurance that a fault in the bus system will be detected in ongoing operation. Therefore, an additional measure that can be provided is for reconfiguration of the bus system. Such a reconfiguration is an initialization, but energy storage mechanism 23 of individual slave stations 11, 12, 13 remains charged during this initialization. For a reconfiguration, master station 1 sends out a reconfiguration signal which causes all slave stations 11 to open connecting switch 14, and if test switches 15 have not been opened again at the end of initialization, this signal causes test switch 15 to be opened. Then the system is reconfigured by having slave station 11 first run through the same program loops as in initialization, with charging of energy storage mechanism 23 being omitted or being necessary but only very briefly. Thereafter, this first slave station 11 will then close test switch 15 again, and a check is performed to determine whether there is a short circuit in downstream slave station 12 or between slave station 11 and downstream slave station 12. Since no time is required for charging up energy storage mechanism 23, reconfiguration of the bus system can take place especially rapidly. However, an acknowledgment of successful reconfiguration of slave stations 11, 12, 13 to master station 1 can take place only by using an active measure on the part of slave stations 11, 12, 13, because a current signal prompted by the charging of energy storage mechanism 23 can no longer be detected.

Figure 4:
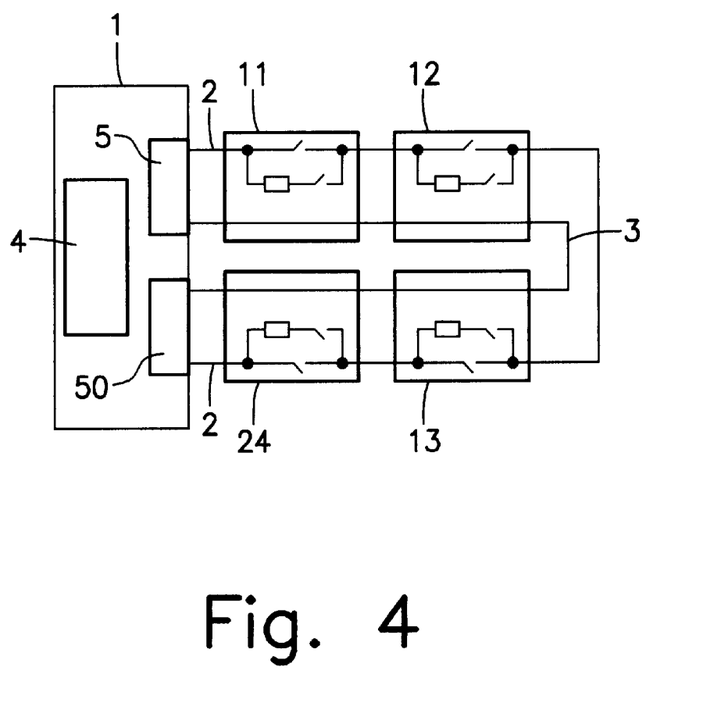
FIG. 4 shows another exemplary embodiment of the bus system according to the present invention.

Initialization and reconfiguration of the bus system are especially advantageous when the bus system is designed as a ring structure, as shown in FIG. 4. FIG. 4 shows a master station 1 with a control logic 4 and an interface 5, such as those already shown in FIG. 1. In addition, master station 1 in FIG. 4 also has another interface 50 which is also connected to bus lines 2 and 3. Bus lines 2 and 3 are thus connected to one of interfaces 5 or 50 at their respective ends, thus forming a ring structure together with master station 1. Slave stations 11, 12, 13 and 24 are arranged between the two interfaces 5 and 50 in this ring. Individual slave stations 11, 12, 13 and 24 correspond to the slave stations as already discussed in conjunction with FIGS. 1 and 2. During initialization, first individual slave stations 11, 12, 13, 24 are initialized starting from interface 5, as already described in conjunction with FIG. 1. Interface 50 initially assumes only pure monitoring functions here, by checking on whether a voltage is also applied to interface 50 between bus lines 2 and 3 after a voltage is applied between bus lines 2 and 3 on the side of interface 5. If this is the case, all slave stations 11, 12, 13 and 24 would be initialized. Starting from interface 5, first slave station 11 is initialized, then slave station 12, then slave station 13 and finally slave station 24. Since the slave stations switch the voltage through only with successful initialization, the presence of a voltage difference at interface 50 between bus lines 2 and 3 is thus a signal that all the slave stations have been successfully initialized. Due to the ring structure here, however, not only is it possible to detect short circuits between the lines, as is the case in FIG. 1, but also line interruptions can be detected. Then when such a fault occurs, an attempt can be made to reach all the slave stations with the help of second interface 50. As an example, let us assume here that a fault occurring between the two slave stations 12 and 13 may be an interruption in bus lines 2, 3 or a short circuit between the two bus lines themselves. In the case of a short circuit, the fault is detected on the basis of the increased power consumption in interface 5. In the case of a short circuit, the fault is noted in interface 50, because then voltage is no longer applied between bus lines 2 and 3. To compensate for the fault, interface 50 is then also activated as a transmission interface, i.e., interface 50 then performs the same functions as interface 5. Both interfaces 5, 50 now apply voltages between bus lines 2 and 3, leading to initialization or reconfiguration of slave stations 11 and 24. After successful initialization or reconfiguration of slave stations 11 and 24, corresponding voltages are then also applied to slave stations 12 and 13, so these slave stations are also initialized or reconfigured. However, these two slave stations cannot switch the voltage through to the next slave station, because there is a line interruption or a short circuit between the two stations. Master station 1 can then address all slave stations 11, 12, 13 and 24 as before by applying the respective messages to interface 5 as well as to interface 50. If the slave stations were arranged as a linear structure, as shown in FIG. 1, slave stations 13 and 24 could no longer be addressed. The structure shown in FIG. 4 is thus especially reliable, because faults can be repaired to an especially great extent. To be arranged in a ring, the individual slave stations are designed in such a way that the operating voltage can be applied from one side as well as the other side.

Figure 5:
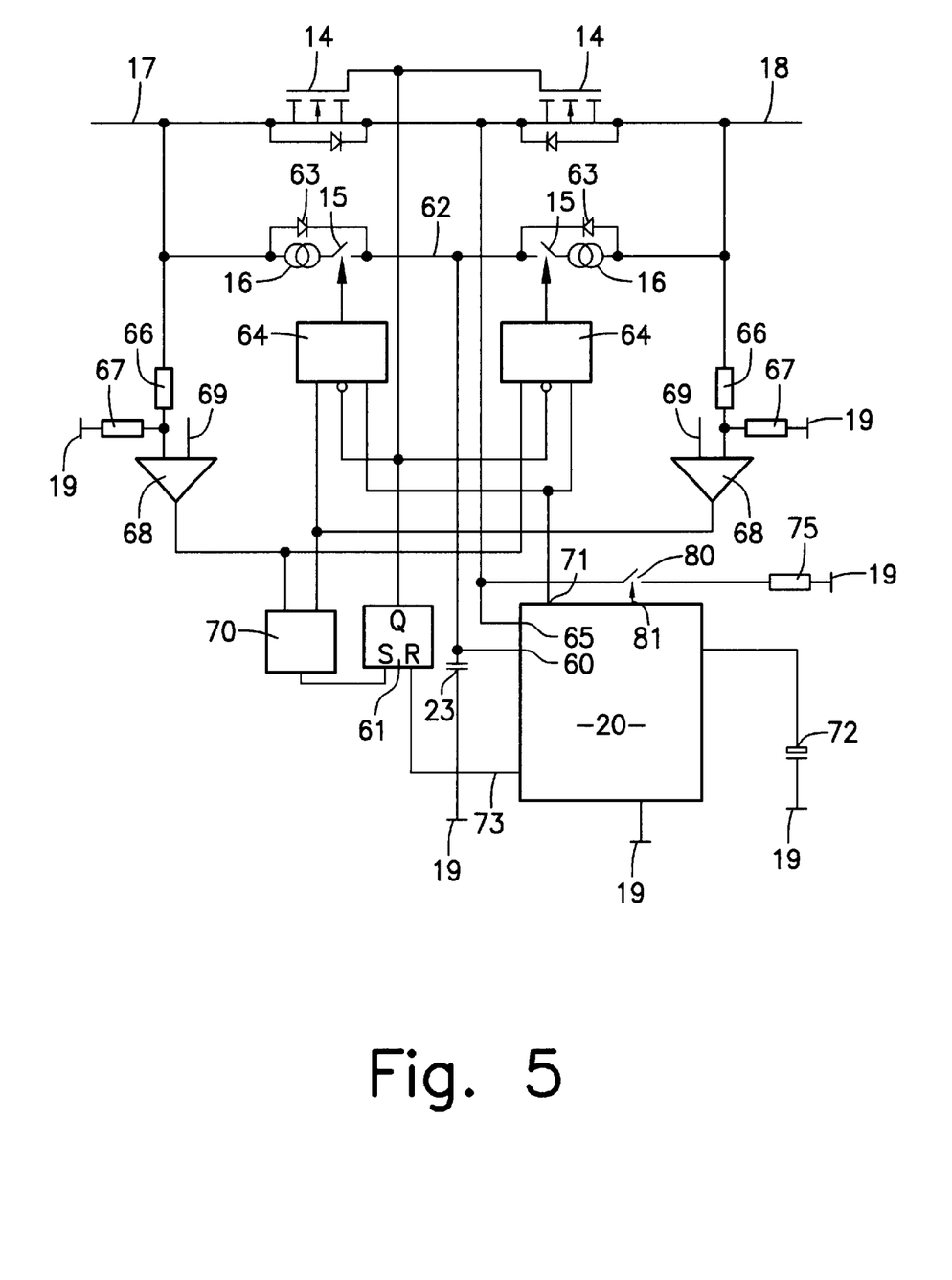
FIG. 5 shows a detailed diagram of the slave station according to the present invention.

A slave bus station, where the power supply can be applied to both sides, is shown in FIG. 5. FIG. 5 shows a slave station with the terminals, which are each connected to bus line 2. Two switches 14 are arranged here between these two terminals 17 and 18, with the switch arranged closer to terminal 17 being designated as left switch 14, and the switch arranged closer to terminal 18 being designated as right switch 14. Several components are present in duplicate with the circuit according to FIG. 5, so this distinction between right component and left component will be used further, with the left component always referring to the component closer to terminal 17 and the right component always denoting the component closer to terminal 18. Switches 14 are designed as MOS transistors, each having a parasitic diode connected in parallel. If the voltage at terminal 17 is greater than that at terminal 18, the parasitic diode of left switch 14 is connected in the direction of flow, so that this voltage can be switched only with right switch 14. Accordingly, left switch 14 is designed as a switch with which a connection can be established between terminals 17 and 18 when the voltage at terminal 18 exceeds the voltage at terminal 17. A tap leading to a signal input 60 of control logic 20 is provided between right switch 14 and left switch 14. The control inputs of switches 14 are connected to the output of a flip-flop 61. If the flip-flop is set, switches 14 are thus closed and two terminals 17 and 18 are connected together with a low resistance. If flip-flop 61 is not set, switches 14 are opened and terminals 17 and 18 are not connected by switches 14. In addition, terminals 17 and 18 are also connected by a test line 62, with two test switches 15 being provided in test line 62. A current limiter 16 connected in series with each of these test switches is shown here as the current source for the sake of simplicity. As already explained, the simplest version of such a current limiting circuit is an appropriate resistor. Right and left test switches 15 are each bridged by an isolating diode 63. These oppositely polarized isolating diodes 63 ensure again that left test switch 15 is suitable for switching a test current when the voltage at terminal 18 is greater than that at terminal 17, while right test switch 15 is provided for switching a test current when the voltage at terminal 17 is greater than that at terminal 18. Test switches 15 are controlled by the output of AND elements 64. A center tap provided between the two test switches and isolating diodes 63 is connected to energy storage mechanism 23. Energy storage mechanism 23 is designed here as a capacitor which is connected at its other terminal to terminal 19 and is thus provided for connecting to bus line 3. In addition, energy storage mechanism 23 is connected to power supply voltage input 65 of control logic 20. Thus, if a voltage is applied between terminals 17 and 19 or terminals 18 and 19, control logic 20 will be supplied with a power supply voltage. Energy storage mechanism 23 serves to compensate for voltage fluctuations and thus always guarantee a uniform power supply to control logic 20. This is true in particular with short-term voltage fluctuations such as those occurring in transmission of messages over the bus lines. In addition, terminals 17 and 18 are each switched with a voltage divider against terminal 19, with the input of a comparator being connected between the two divider resistors 66, 67. The comparator compares this voltage with a reference voltage which is applied to terminal 69 of the comparator. This reference voltage may be made supplied to control logic 20 by a d.c. voltage supply, for example. The outputs of comparators 68 are each connected to the two inputs of an AND element 70. The output of AND element 70 is connected to the set input of flip-flop 61. This design of voltage dividers 66, 67, comparators 68, AND element 70 and flipflop 71 causes a voltage comparison to be performed between the two terminals 17 and 18. The reference voltages applied to inputs 69 are selected so that comparators 68 deliver the signals when the voltages at terminals 17 and 18 approach the setpoint voltages on the bus. For example, if a voltage of 24 volts is to be applied by master station 1 between lines 2 and 3, the circuits are designed so that comparators 68 deliver a signal when the voltages at terminals 17 and 18 exceed 20 volts. If such a voltage is only applied to one side, e.g., left terminal 17, first only left comparator 68 is switched through, so that only one input signal is applied to the AND element. Therefore, AND element 70 will not produce an output signal. This takes place only when a corresponding voltage is applied to terminal 18 and then right comparator 68 indicates this. Since both inputs of AND element 70 are activated then, the AND element will also output a signal which is then delivered to the set input of flip-flop 61. This causes flipflop 61 to be set, so that switches 14 can then be switched through. Switches 14 are thus switched through automatically when the voltage applied to terminals 17 and 18 approaches the voltage preset by master station 1.

If the voltage is applied by master station 1 to only one side first, e.g., to terminal 17, the slave station can increase the voltage at the other terminal through test switches 15. If the potential is applied to terminal 17, left comparator 68 is switched, with the output of this comparator being connected to an input of right AND element 64. In addition, a terminal of right AND element 64 is connected to the output of flip-flop 61, but this signal is negated. Another input of the AND element is connected to a gate 71 of control logic 20. Right AND element 64, which causes right test switch 15 to be switched, thus delivers a signal for operation of right test switch 15 only when a sufficiently high voltage is applied to terminal 17 (input connected to left comparator 68), when switches 14 are open (negated connection to flip-flop 61) and when a corresponding control signal is output by control logic 20 to gate 71. A corresponding control signal is output by control logic 20 only when the initialization or reconfiguration of the slave station shown here is concluded. This requires energy storage mechanism 23 to be charged sufficiently, control logic 20, if provided, to receive an address from master station 1 and another working energy storage mechanism 72 to be charged. This additional working energy storage mechanism 72 is provided here as an electrolyte capacitor, i.e., a capacitor that can hold a large quantity of energy. Such a capacitor is capable of, for example, holding a quantity of energy suitable for deploying an airbag system or a pyroelectric seat belt lock. If other measures are also provided for initialization, control logic 20 will terminate these measures first and only then output a corresponding signal to gate 71. Working energy storage mechanism 72 can be charged by connecting in control logic 20 a corresponding switch (not shown here) with which electrolyte capacitor 72 is connected between terminal 17 or 18 and terminal 19. When all the inputs of AND element 64 have been activated, a corresponding output signal is output by AND element 64, and test switch 15 is closed. Since a limited current flow is possible between terminals 17 and 18, the downstream slave station is also supplied with a power supply voltage. First, however, the voltage applied to terminal 18 remains lower than the voltage applied to terminal 17, because first energy storage mechanism 23 is charged with the downstream slave station, and optionally a corresponding working energy storage mechanism 72 is also charged. Only when the current demand of the downstream slave station is reduced can the potential at terminal 18 increase and lead to switches 14 being switched through. Test switch 15 is then opened again because the negated input of AND element 64 is reset again.

Control logic 20 also has a reconfiguration output 73 with which flip-flop 61 can be reset. This causes switches 14 to be reopened. Control logic 20 outputs a corresponding signal at reconfiguration output 73 when it receives a reconfiguration signal from the master station. In this way, master station 1 can cause a reconfiguration of the bus system. The master station will again apply a voltage between bus lines 2, 3 after such a signal, so that then a high potential is again applied to terminal 17, for example. Terminal 18 which is then no longer connected to the power supply is then reduced to a lower voltage by voltage dividers 66, 67, so that the downstream slave station is first separated from the master station. The slave station shown here can then exchange messages with master station 1 again, e.g., have a new address or the like allocated to it. Since energy storage mechanisms 23 and 72 are not discharged in reconfiguration, this procedure can take place very rapidly, so that reconfiguration of the bus system proceeds very rapidly. If after reconfiguration, control logic 20 delivers a corresponding signal to gate 71, the voltage at terminal 18 will very quickly approach the voltage at terminal 17, because no energy storage mechanism need be charged. In addition, control logic (20) also has a short-circuit switch (80) which is driven by a gate (81) of control logic (20). The bus lines (2 and 3), i.e., terminals (17, 18 and 19) can be shortcircuited to one another across a current-limiting resistor 75 by this short-circuit switch (80). The slave station thus has an opportunity to transmit signals back to master station 1.

Figure 6:
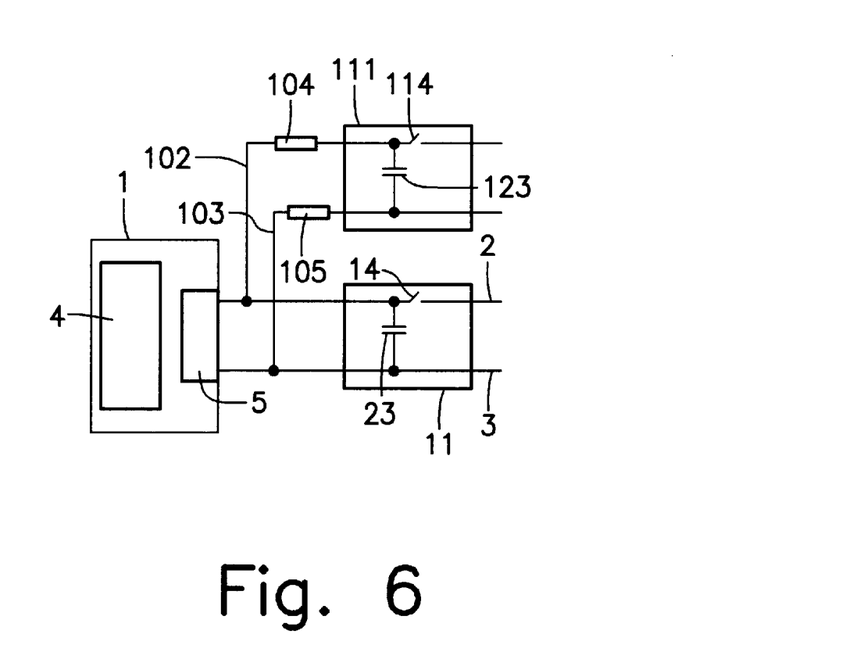
FIG. 6 shows yet another exemplary embodiment of the bus system according to the present invention.

FIG. 6 shows another embodiment of the bus system according to the present invention. Master station 1 with control logic 4 and interface 5 and slave station 11 connected to it by bus lines 2, 3 with switch 14 and energy storage mechanism 23 again correspond to the design described in conjunction with FIGS. 1 and 2. However, yet another slave station 111 is provided, connected across resistors 104 and 105 to bus lines 2 and 3 by additional bus lines 102 and 103. This arrangement is selected so that there is a parallel connection of additional slave station 111 in parallel to slave station 11. Additional slave station 111 is designed like the slave stations already described, but for reasons of simplicity, FIG. 6 shows only connecting switch 114 and energy storage mechanism 123 of additional slave station 111. Likewise, only connecting switch 14 and energy storage mechanism 23 are shown with slave station 11.

Due to the parallel connection, the same electric voltage delivered by interface 5 to bus lines 2 and 3 and thus also to the additional bus lines 102 and 103 is applied to slave stations 11 and 111. However, since the current flow is limited by resistors 104, 105, energy storage mechanism 123, which is designed as a capacitor, is charged more slowly at the same capacitance as energy storage mechanism 23, so that slave station 11 is initialized more quickly than additional slave station 111 after applying electric voltages to bus lines 2, 3. This measure thus yields an equalization of the initialization of the two stations again, so that interface 5 need not apply the current for simultaneous charging of two energy storage mechanisms. In addition, the arrangement according to FIG. 6 can be utilized to particular advantage when an address is assigned by master station 1 to each slave station during initialization. Master station 1 can thus issue a first address for slave station 11, if the latter has advanced far enough with initialization, and if initialization of additional slave station 111 has not yet proceeded to the extent that this additional slave station 111 is ready to receive an address. If an address has already been entered into slave station 11 and then additional slave station 111 is initialized to the extent that an address can also be entered there, master station 1 can then output another address for additional slave station 111. The times when master station 1 outputs the address for slave station 11 and then outputs the additional address for additional slave station 111 can either be preset in a fixed manner on the basis of the rate at which energy storage mechanisms 23, 123 are charged, or they can be determined by return messages of slave stations 11, 111 or by observation of the current flow in interface 5. In addition, not only can additional bus lines 102, 103 be connected between master station 1 and a first downstream slave station 11, but also a connection between two slave stations, e.g., slave stations 12 and 13 in FIG. 1, is possible.

Figure 7:
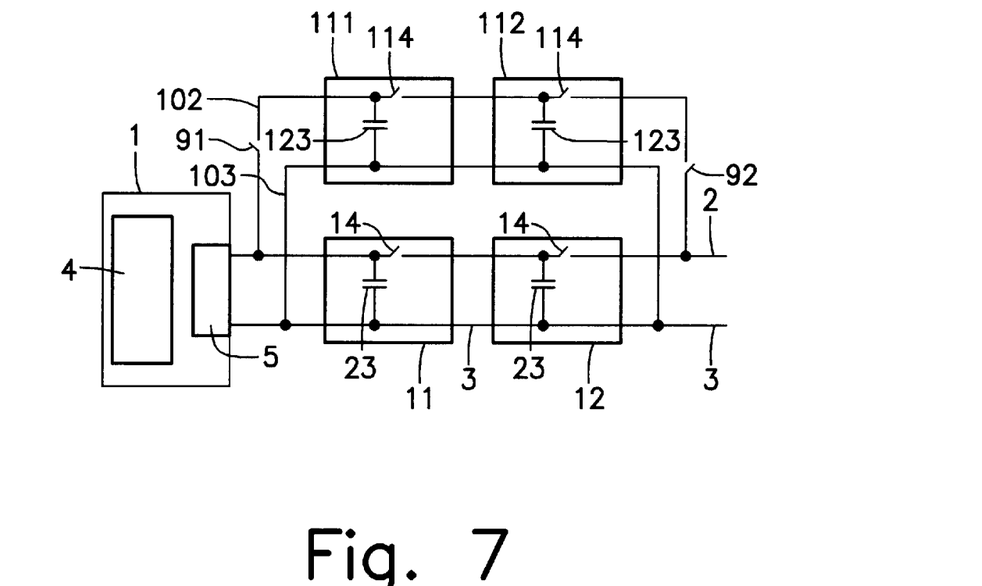
FIG. 7 shows a further exemplary embodiment of the bus system according to the present invention.

FIG. 7 shows another embodiment with a master station 1 and two slave stations 11 and 12, which in turn correspond to the known design according to FIG. 1. In addition, two other slave stations 111 and 112 are also provided, connected to additional bus lines 102 and 103. Additional slave stations 111 and 112 correspond to the slave stations described above, with only connecting switches 114 and energy storage mechanisms 123 being shown for the sake of simplicity. Additional slave stations 111 and 112 are arranged with regard to additional bus lines 102 and 103, exactly like slave stations 11 and 12 with regard to bus stations 2 and 3. In addition, switches 91 and 92 are provided, so that additional bus line 102 between first additional slave station 111 and master station 1 and between second additional slave station 112 and bus line 2 can be interrupted. If switches 91, 92 are closed, additional slave stations 11, 112 are connected in parallel with slave stations 11, 12. During initialization, these two switches 91 and 92 are opened first, so that additional slave stations 111, 112 are separated electrically from master station 1. Then, in a manner already described, slave stations 11 and 12 are initialized, and optionally additional slave stations connected directly to bus lines 2 and 3 are also initialized. When this initialization is concluded, switch 91 is closed, and then the first additional slave station 111 is initialized, and when this initialization is concluded, additional slave station 112 downstream is also initialized. Then switch 92 is closed. When additional slave stations 111, 112 are designed as indicated in FIG. 5, initialization can of course take place by closing switch 92 and then initializing additional slave station 112 first. Thus, additional slave stations 111, 112 and slave stations 111, 112 can be initialized individually in succession because of switches 91, 92, so that the charging current for the energy storage mechanisms is low and the addresses can be issued individually. If it is desirable to assign the same addresses to parallel slave stations and additional slave stations, switches 91, 92 can also be closed during initialization of the bus system.

Figure 8:
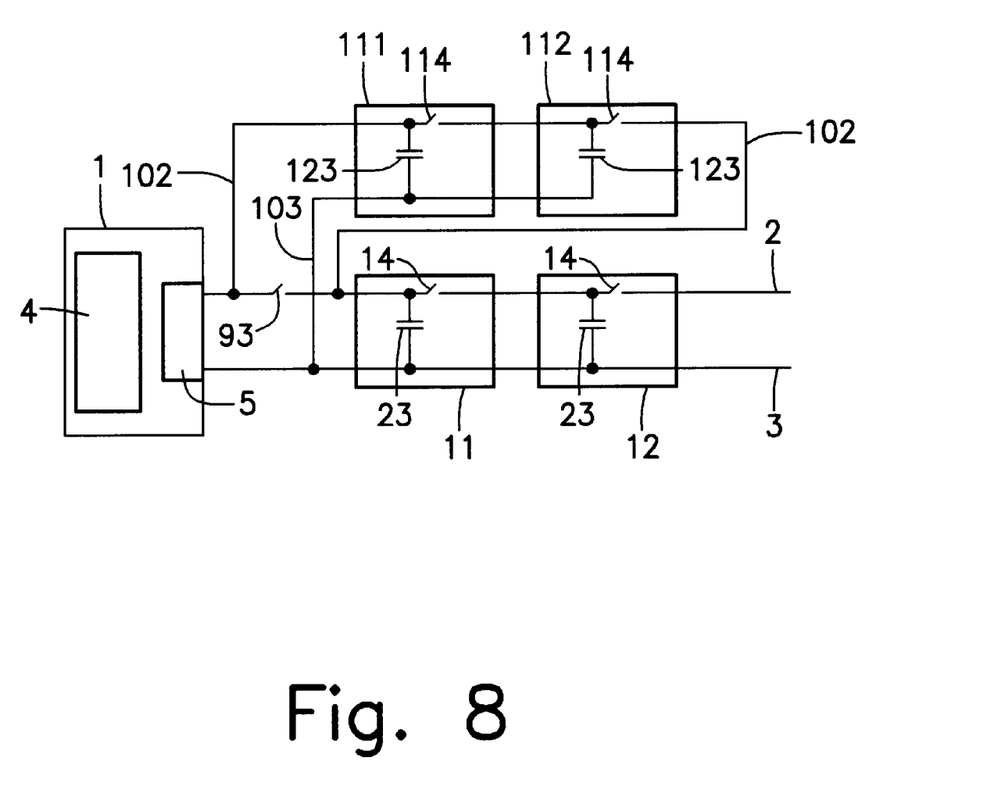
FIG. 8 shows another exemplary embodiment of the bus system according to the present invention.

FIG. 8 shows another embodiment of a bus system, where a master station 1 and slave stations 11, 12 are provided and are connected to one another by bus lines 2, 3 as already shown in FIG. 1. However, a switch 93 is provided in bus line 2, with a terminal for an additional bus line 102 being provided upstream from the switch and a terminal for an additional bus line 103 being provided downstream from the switch. Bus line 102 passes through additional slave stations 111 and 112 in a known manner, with this additional bus line 102 being interruptible or connectable by connecting switches 114 arranged in additional slave stations 111 and 112. When switch 93 is opened, first additional slave stations 111 and 112 are initialized and then slave stations 11 and 12 are initialized by returning additional bus line 102 to a terminal downstream from switch 93. However, this return line can also be omitted if switch 93 is closed after initialization of additional slave station 112. A plurality of slave stations can again be initialized in succession without requiring a complicated cable installation.

We claim:

1. A slave station for a bus system with one master station and at least two slave stations, the master station being electrically connected to the at least two slave station by bus lines, the slave station comprising:
   a first terminal and a second terminal, at least one of the bus lines being connected between the first terminal and the second terminal;
   a connecting switch, the at least one of the bus lines being interrupted when the connecting switch is opened; and
   an energy storage mechanism electrically coupled to the bus lines;
   wherein during initialization of the slave station, the connecting switch is opened and any downstream slave stations is electrically separated from the master station by the opened connecting switch and the energy storage mechanism is empty, and
   wherein the energy storage mechanism is chargeable by an electric voltage between the bus lines, and after charging the energy storage mechanism, the connecting switch is closed.

2. The slave station according to claim 1, further comprising:
   a test switch for electrically coupling the first terminal to the second terminal;
   a current limiter connected in series to the test switch; and
   an comparator device comparing a voltage applied to the second terminal with a voltage applied to the first terminal;
   wherein when the test switch is closed, the first terminal is connected to the second terminal via the test switch, the current limiter limiting a current flow between the first terminal and the second terminal, the test switch being closed before the connecting switch is closed, the connecting switch being closed only when a voltage difference between the first terminal and the second terminal drops below a predetermined level.

3. The slave station according to claim 2, further comprising:

a working energy storage mechanism, the working energy storage mechanism being empty on initialization and being chargeable by the electric voltage on the bus lines.

4. The slave station according to claim 3, further comprising:

a logic circuit, power for operating the logic circuit being obtained from the energy storage mechanism, the power obtained being replaceable by the electric voltage on the bus lines.

5. The slave station according to claim 4, wherein after the working energy storage mechanism is charged, the logic circuit checks the bus lines for electric signals representing a predetermined message, the logic circuit triggering an action in response to the predetermined message using the power stored in the working energy storage mechanism.

6. The slave station according to claim 5, wherein the logic circuit generates a signal to open the connecting switch in response to the predetermined message, a signal for closing the test switch being generated by the logic circuit when a predetermined electric voltage is applied to the bus lines.

7. The slave station according to claim 4, wherein the logic circuit generates a signal to close the test switch.

8. The slave station according to claim 4, wherein the logic circuit includes a memory device, an address transmitted from the master station to the slave station on initialization before closing the connecting switch being written to the memory.

9. The station according to claim 4, further comprising:

a signal generator generating an electric signal on the bus lines, the signal generator being driven by the logic circuit.

10. A master station for a bus system with one master station and at least two slave stations, the master station being electrically connected to the slave stations by bus lines, the master stations comprising:

a first terminal;

a second terminal;

a third terminal, a first one of the bus lines being connected between the first terminal and the third terminal; and a fourth terminal, a second one of the bus lines being connected between the second terminal and the fourth terminal, the slave stations being connectable between the terminal via the first one of the bus lines and the second one of the bus lines;

wherein on initialization, the master station applies a voltage to the first terminal and the second terminal, after the voltage is applied between the first terminal and the second terminal, the master station determines if a voltage is applied between the third terminal and the fourth terminal, the master station delivering messages to the bus lines after initialization.

11. The master station according to claim 10, wherein the master station applies a voltage between the third terminal and the fourth terminal after a predetermined period of time when there is no voltage between the third and fourth terminal, the master station applying the messages to the first terminal, the second terminal, the third terminal and the fourth terminal after initialization and after applying the voltage between the third terminal and the fourth terminal.

12. The master station according to claim 10, wherein the master station applies the messages to the first terminal and the second terminal when there is a voltage between the third terminal and the fourth terminal after initialization.

13. A master station for a bus system with one master station and at least two slave stations, the master station being electrically connected to the slave stations by bus lines, the master station comprising:

a circuit delivering messages to the bus lines after initialization;

a voltage source, the master station applying a voltage from the voltage source between the bus lines to supply the slave stations during initialization;

a first current flow detector detecting a first current flow over the bus lines during initialization; and an analysis arrangement analyzing the first current flow and determining whether the slave stations have been initialized.

14. The master station according to claim 13, further comprising:

a second current flow detector detecting a second current flow over the bus lines after initialization, wherein when the second current flow is above a reference value, the master station delivering a message to the bus lines informing the slave stations of an occurrence of excessive currents.

15. A bus system, comprising:

first bus lines;

a master station; and at least two slave stations, the master station and the at least two slave stations being connected to one another by the first bus lines, a first one of the slave stations being connected downstream from the master station and including a connecting switch and a first energy storage mechanism, a second one of the slave stations being connected downstream from the first one of the slave stations, the master station supplying a power supply voltage for the slave stations over the first bus lines, wherein in a startup of the bus system, the master station applies the power supply voltage to the first bus lines during initialization, at least one of the first bus lines being interrupted by opening the connecting switch in the first one of the slave stations, the second one of the slave stations being electrically separated from the master station by the opened connecting switch, the first one of the slave stations being subsequently initialized and the first energy storage mechanism being charged, the first one of the slave stations closing the connecting switch after the first energy storage mechanism is charged so that the second one of the slave stations is supplied by the power supply voltage.

16. The bus system according to claim 15, wherein the second one of the slave stations includes a connecting switch, the connecting switch of the second one of the slave stations being open during initialization and interrupts at least one of the first bus lines, the first one of the slave stations being initialized and closes the connecting switch of the first one of the slave stations after initialization, the second one of the slave stations being initialized and closes the connecting switch of the second one of the slave stations after initialization.

17. The bus system according to claim 16, wherein a third one of slave stations includes a second energy storage mechanism, the third one of the slave stations being connected electrically in parallel with at least one of the first one of the slave stations and the second one of the slaves stations via further bus lines.

18. The bus system according to claim 17, wherein the further bus lines are electrically connected to the first bus lines, the bus system further comprising:

a resistor arranged between the third one of the slave stations and the first bus lines in at least one of the further bus lines.

19. The bus system according to claim 17, wherein the further bus lines are electrically connected to the first bus lines, the bus system further comprising:

a switch arranged in at least one of the further bus lines between the third one of the slave units and the first bus lines.

20. The bus system according to claim 19, wherein an address for the slave stations are sent from the master station of the bus lines during initialization, a position of switch determining for which one of the slave stations the address is intended.

21. The bus system according to claim 17, wherein at least one of the first bus lines has a switch, one of the further bus lines has a first electric terminal upstream from the switch and a second electric terminal downstream from the switch, the third slave station being connected to the further bus lines between the first electric terminal and the second electric terminal.

22. The bus system according to claim 18, wherein address for the slave stations are sent from the master station to the first bus lines during initialization, after output of a first one of the addresses for the first one of the slave stations, a second one of the addresses for the second one of the slave stations is output after a predetermined period of time, the time being selected as a function of the resistor.

23. A method of operating a bus station with a master station and at least two slave stations connected to one another by bus lines, comprising the steps of:

supplying by the master station a power supply voltage for the slave stations over the bus lines;

performing an initialization during a startup of the bus system;

during initialization, applying a voltage by the master station of the bus lines;

interrupting at least one of the bus lines by a first one of the slave stations by opening a connecting switch in the first one of the slave stations;

initializing the first slave station of charge an energy storage mechanism; and closing the connecting switch in the first one of the slave stations so that a second one of the slave stations is supplied by the power supply voltage.

* * * * *